United States Patent
Arai et al.

(10) Patent No.: US 7,452,926 B2
(45) Date of Patent: Nov. 18, 2008

(54) RESIN PULLEY FORMED OF A RESIN COMPOSITION HAVING A PHENOL RESIN, AN INORGANIC POWDER, A REINFORCING FIBER, AND A LUBRICANT

(75) Inventors: Hirokazu Arai, Yamatokoriyama (JP); Takeshi Tsuda, Kashiba (JP); Hiroto Oda, Shimodate (JP)

(73) Assignees: JTEKT Corporation, Osaka (JP); Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/649,798

(22) Filed: Aug. 28, 2003

(65) Prior Publication Data

US 2004/0044115 A1 Mar. 4, 2004

(30) Foreign Application Priority Data

Aug. 29, 2002 (JP) ............................. 2002-251262

(51) Int. Cl.
*C08J 5/00* (2006.01)
*C08K 3/36* (2006.01)
*C08K 3/40* (2006.01)
*C08L 27/12* (2006.01)

(52) U.S. Cl. ..................... 523/149; 524/493; 524/494; 524/545

(58) Field of Classification Search ................. 524/493, 524/494; 523/149
See application file for complete search history.

(56) References Cited

U.S. PATENT DOCUMENTS

| | | | | |
|---|---|---|---|---|
| 4,790,799 | A | | 12/1988 | Sadler |
| 4,898,905 | A | * | 2/1990 | Kawakami et al. ........... 524/404 |
| 5,124,397 | A | * | 6/1992 | Kanazawa et al. ........... 524/496 |
| 5,514,748 | A | * | 5/1996 | Isutsumi et al. .............. 524/600 |
| 5,797,819 | A | | 8/1998 | Arai |
| 6,336,025 | B1 | * | 1/2002 | Saeki .......................... 399/301 |
| 6,355,195 | B1 | | 3/2002 | Funatsu et al. |
| 6,716,907 | B2 | * | 4/2004 | Asai et al. ................... 524/494 |
| 2002/0086930 | A1 | | 7/2002 | Yazawa et al. |
| 2002/0123557 | A1 | | 9/2002 | Asai et al. |

FOREIGN PATENT DOCUMENTS

| | | | |
|---|---|---|---|
| EP | 1 219 681 A1 | | 7/2002 |
| JP | 60-57452 | | 2/1980 |
| JP | 57205472 A | * | 12/1982 |
| JP | 60072952 A | * | 4/1985 |
| JP | 63170412 A | * | 7/1988 |
| JP | 01-161034 | | 6/1989 |
| JP | 3-28535 | | 6/1991 |
| JP | 05-106707 | | 4/1993 |
| JP | 05170937 A | * | 7/1993 |
| JP | 06065393 A | * | 3/1994 |
| JP | 06322232 A | * | 11/1994 |
| JP | 8-142112 | | 6/1996 |
| JP | 8-145148 | | 6/1996 |
| JP | 08-159244 | | 6/1996 |
| JP | 9-217818 | | 8/1997 |
| JP | 10053692 A | * | 2/1998 |
| JP | 10-254092 | | 9/1998 |
| JP | 10-299849 | | 11/1998 |
| JP | 11-156952 | | 6/1999 |
| JP | 2000-265048 | | 9/2000 |
| JP | P3192082 | | 5/2001 |
| JP | 2001-280449 | | 10/2001 |
| JP | 2002-139027 | | 5/2002 |
| JP | 2002-201335 | | 7/2002 |
| JP | 2003172433 A | * | 6/2003 |
| KR | 2000-006017 | | 1/2000 |

OTHER PUBLICATIONS

Wypych, George; Handbook of Fillers 2nd Ed., ChemTech Publishing, New York, 2000 (p. 287).*
Abstract for JP 57205472, JP 60072952, JP 63170412, JP 05170937, JP 06065393, JP 10053692, JP 2003172433, JP 06322232.*
Machine Translations for JP 05170937 (p. 1-7), JP 06065393 (p. 1-3), JP 10053692 (p. 1-5), JP 2003142433 (p. 1-5), JP 06322232 (p. 1-5).*

* cited by examiner

*Primary Examiner*—Tae H Yoon
(74) *Attorney, Agent, or Firm*—Rabin & Berdo, PC

(57) ABSTRACT

A resin pulley according to the present invention is obtained by molding a resin composition containing a phenol resin serving as a base resin, 15 to 50% by weight of an inorganic powder having a Mohs hardness of not less than 6.5, 20 to 40% by weight of a reinforcing fiber, and 1 to 5% by weight of a lubricant and thermosetting the phenol resin, and is superior in dimensional stability and strength, is also superior in wear resistance particularly in a dust atmosphere or the like, and is superior in practicality as an alternate to a metal pulley.

4 Claims, 1 Drawing Sheet

RESIN PULLEY FORMED OF A RESIN COMPOSITION HAVING A PHENOL RESIN, AN INORGANIC POWDER, A REINFORCING FIBER, AND A LUBRICANT

TECHNICAL FIELD

The present invention relates to a resin pulley suitable for use particularly in the vicinity of an engine of an automobile or the like.

BACKGROUND OF THE INVENTION

Although metal pulleys have been common as pulleys used in the vicinities of engines of automobiles or the like, the substitution of the metal pulleys for resin pulleys has been examined with recent requests to make automobile parts small, lightweight, and low in cost.

Particularly, a resin pulley using a phenol resin as a base resin, and obtained by reinforcing the phenol resin by a reinforcing fiber and curing the phenol resin simultaneously with or after molding has good dimensional stability and strength which are approximately the same as those of the metal pulley.

However, the wear resistance of the resin pulley is liable to be reduced as the content of the reinforcing fiber is increased in order to improve such dimensional stability and strength. The resin pulley is liable to wear away when it is brought into contact with raised dust or the like, particularly in a dust atmosphere in cases such as a case where the automobile travels on an unpaved road as the wear resistance is reduced. Therefore, the wear resistance of the resin pulley may not be sufficient, as compared with that of the metal pulley.

Accordingly, various types of attempts have been made to put a resin pulley having superior properties which can be used as an alternative to the metal pulley to practical use.

For example, Japanese Laid Opened Patent Application No. 08-159244 (1996) suggests forming a resin pulley of a resin composition obtained by adding to a phenol resin, a mica powder, a glass fiber and at least one type of inorganic powder selected from a group consisting of calcium carbonate, clay, and wallastonite, to improve the wear resistance of the resin pulley.

However, both the inorganic powder and the mica powder, as illustrated, are soft. Accordingly, each of the powders itself is liable to wear away by coming into contact with the dust or the like particularly in the above-mentioned dust atmosphere. Further, respective fine powders of the inorganic powder and the mica powder which have worn away to drop out of the resin pulley, together with the dust, promote the wear of the resin pulley. Therefore, the wear resistance of the resin pulley is rather reduced.

Japanese Patent Publication No. 3192082 suggests forming a resin pulley of a resin composition obtained by adding to a phenol resin an inorganic fiber, an organic fiber, a silica powder, and an elastomer, to improve the wear resistance of the resin pulley.

The silica powder is harder than the inorganic powder and the mica powder, previously described. Accordingly, the improvement of the wear resistance of the resin pulley in the dust atmosphere or the like is expected.

However, the content of the silica powder is as low as 3 to 7% by weight to the total amount of the resin composition. Moreover, the resin composition contains a soft organic fiber and an elastomer. Accordingly, the effect of improving the wear resistance of the resin pulley in the dust atmosphere or the like is also insufficient.

SUMMARY OF THE INVENTION

An object of the present invention is to provide a new resin pulley that is superior in dimensional stability and strength, is also superior in wear resistance particularly in a dust atmosphere or the like, and can be sufficiently used as an alternate to a metal pulley.

A resin pulley according to the present invention for attaining the above-mentioned object is characterized in that it is formed of a resin composition, and the resin composition contains a phenol resin as a base resin, and contains 15 to 50% by weight of an inorganic powder having a Mohs hardness of not less than 6.5, 20 to 40% by weight of a reinforcing fiber, and 1 to 5% by weight of a lubricant.

According to the present invention, the resin pulley is superior in dimensional stability and strength because the phenol resin serving as the base resin is reinforced by the reinforcing fiber.

And the resin pulley is also superior in wear resistance because it contains the inorganic power having a Mohs hardness of not less than 6.5.

It is preferable that the inorganic powder is a spherical silica powder having an average particle diameter of not more than 30 µm.

Such a fine spherical silica powder is superior in dispersion properties and therefore, can be more uniformly dispersed in a surface portion of the resin pulley. Therefore, the wear resistance of the resin pulley can be further improved.

It is also possible to restrain the wear of a metal mold by using such a spherical silica powder, in filling a cavity, corresponding to the shape of the resin pulley, of the metal mold with a resin composition heated, melted, and fluidized by injection molding, and then curing the phenol resin to produce the resin pulley.

It is preferable that the lubricant is a fluororesin powder having an average particle diameter of not more than 10 µm.

Such a fine spherical fluororesin powder is thus superior in dispersion properties and therefore, can be more uniformly dispersed in the surface portion of the resin pulley. Consequently, the wear resistance of the resin pulley can be further improved by only adding the fluororesin powder in small amounts to provide good lubricating properties to the surface of the resin pulley.

It is preferable that the reinforcing fiber is a glass fiber.

The phenol resin is more firmly reinforced by the glass fiber, thereby making it possible to further improve the dimensional stability and the strength of the resin pulley.

It is preferable that the phenol resin is a phenol resin having a number average molecular weight of 600 to 900.

It is also possible to adjust the fluidity of a resin composition heated, melted, and fluidized by injection molding, for example, using such a phenol resin in filling a cavity, corresponding to the shape of the resin pulley, of a metal mold with the resin composition, and then curing the phenol resin to produce the resin pulley in a suitable range, to fill all corners of the cavity with the resin composition with no space therebetween and almost uniformly. Accordingly, it is possible to form a good resin pulley having no molding defects such as a short shot, bubbles, and a weld line.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
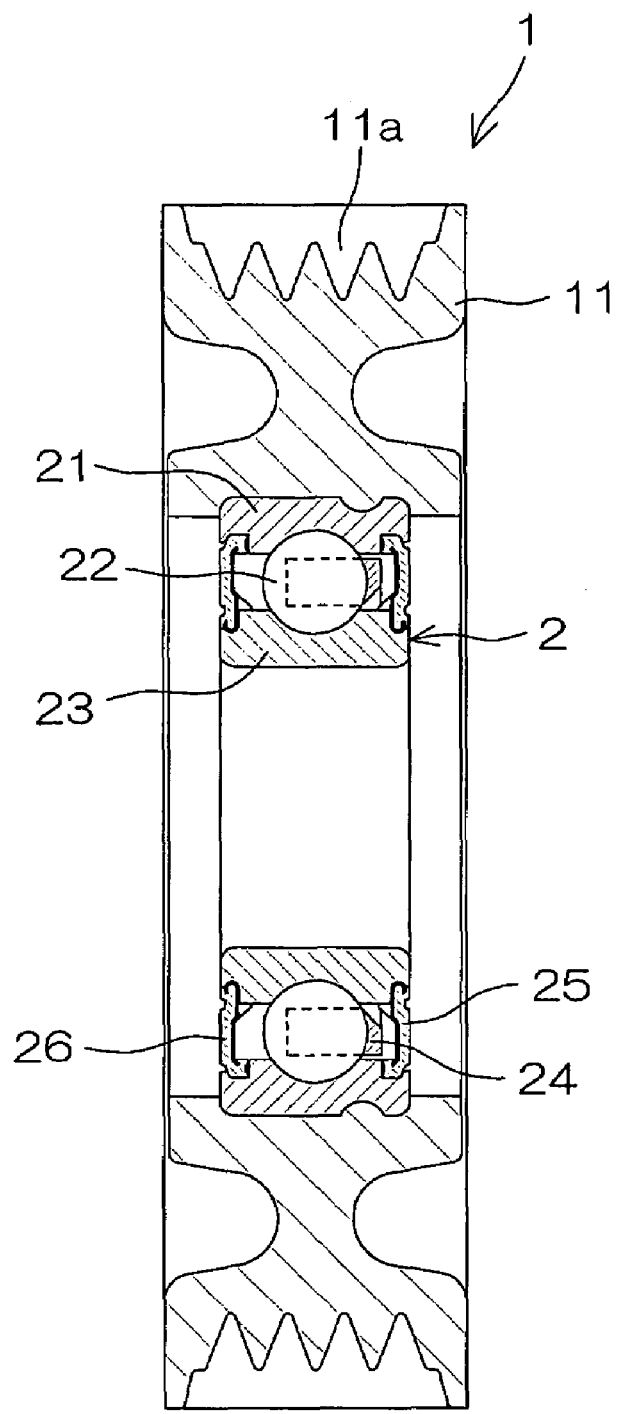
FIG. 1 is a cross-sectional view showing an example of an embodiment of a resin pulley according to the present invention.

Description is now made of the present invention.

As described above, a resin pulley according to the present invention is characterized in that it is formed of a resin composition, and the resin composition contains a phenol resin as a base resin, and contains an inorganic powder having a Mohs hardness of not less than 6.5, a reinforcing fiber, and a lubricant.

Specifically, the whole of the resin pulley may be formed of the above-mentioned resin composition, or may be formed into a composite structure obtained by a metal hub connecting with a shaft and a pulley main body composed of the resin composition so as to surround the hub.

The former resin pulley can be produced by injection molding, as previously described.

That is, the resin pulley can be produced by heating and melting a resin composition containing the above-mentioned components in a cylinder of an injection molding machine, and then injecting the resin composition into a cavity, corresponding to the shape of the resin pulley, of a metal mold heated at not less than the curing temperature of the phenol resin to fill the cavity therewith, and to thermoset the phenol resin.

The latter resin pulley having the composite structure can be produced by insert molding which is one type of injection molding.

That is, the resin pulley having the composite structure can be produced by preparing a metal mold having a cavity corresponding to the shape of the pulley main body of the resin pulley and having a holding portion for holding the hub provided in its center. Then, a resin composition heated and melted in a cylinder of an injection molding machine is injected into the cavity to fill the cavity therewith while previously heating the metal mold at not less than the curing temperature of the phenol resin in a state where the hub is held in the holding portion of the metal mold, to thermoset the phenol resin.

As the hub, an outer ring 21 of a rolling bearing 2 shown in FIG. 1 can be used to integrate with a pulley main body 11 by insert molding, instead of the hub having a single member directly connected to the shaft. The pulley main body 11 has a peripheral recess 11a. A rolling element 22, an inner ring 23, a cage 24, and covers 25 and 26 are combined with the outer ring 21 integrated with the pulley main body 11 to assemble the rolling bearing 2, and the assembled rolling bearing 2 is filled with grease, thereby making it possible to construct the resin pulley 1.

Considering that the resin pulley is produced by the above-mentioned injection molding or the like, a novolak type phenol resin or a resol type phenol resin, both of which are a solid at room temperature, are preferable as a phenol resin contained in the resin composition.

Particularly when the resin pulley has an insert member made of a metal, for example, the above-mentioned hub, the resol type phenol resin withstanding heat shock and superior in dimensional stability is more preferable.

When the novolak type phenol resin is used, it is preferable that hexamethylenetetramine is mixed as a curing agent at a rate of 12 to 20 parts by weight per 100 parts by weight of the phenol resin.

It is preferable to use, as the phenol resin, a phenol resin having a number average molecular weight of 600 to 900 irrespective of the type of resin in order to adjust the fluidity of the resin composition (resin flow) in a suitable range in producing the resin pulley by injection molding, as previously described.

In a resin composition using a phenol resin having a number average molecular weight of less than 600, the viscosity thereof at the state of heating and melting is too low, so that a sufficient resin pressure cannot be obtained at the time of injection molding. On the other hand, in a resin composition using a phenol resin having a number average molecular weight of more than 900, sufficient fluidity cannot be obtained at the state of heating and melting. In either case, therefore, a good resin pulley having no molding defects such as a short shot, bubbles, a weld line may not be formable.

As the number average molecular weight of the phenol resin, a particularly optimum range in the above-mentioned range can be selected in order to obtain optimum fluidity conforming to the shape, the structure, or the like of a metal mold used for molding, for example. When a resin pulley is formed using a metal mold of a film gate type, as in an example, described later, it is preferable that the number average molecular weight of the phenol resin is about 800 in the above-mentioned range.

The amount of the phenol resin is set such that the content of the sum of components, described below, and the phenol resin is 100% by weight. That is, the amount of the phenol resin is defined such that the content of the sum of the components and the phenol resin is 100% by weight.

As the inorganic powder, various types of inorganic powders having a Mohs hardness of not less than 6.5 can be used.

Examples of such inorganic powders include a silica powder (Mohs hardness 7 to 8), an alumina powder (Mohs hardness 8), and a zirconia powder (Mohs hardness 11).

Since the inorganic powders are hard, each of the inorganic powders itself does not easily wear away even if it is brought into contact with dust in a dust atmosphere or the like. Accordingly, a fine powder of the inorganic powder which has worn away to drop out of the resin pulley is not produced. Therefore, the resin pulley does not wear. Consequently, the inorganic powder is possible to prevent the wear of the resin pulley and to improve the wear resistance of the resin pulley.

Particularly the silica powder is a main component of the dust for wearing the resin pulley in the dust atmosphere, and is generally harder than the dust containing impurities. Accordingly, the silica powder itself does not only easily wear away. Conversely, the silica powder grinds and wears the dust with which it is brought into contact. Therefore, the wear resistance of the resin pulley can be further improved.

In a case where a spherical silica powder having an average particle diameter of not more than 30 μm is used as the silica powder, as described above, it does not more easily aggregate as compared with that having a larger particle diameter. The silica powder can be more uniformly dispersed in a surface portion of the resin pulley, thereby making it possible to further improve the wear resistance of the resin pulley.

In a case where a silica powder having a larger particle diameter than that of the spherical silica powder, a non-spherical silica powder, or the like is used, when it collides with a metal mold at the time of injection molding, the surface thereof easily wears away. However, the above-mentioned fine spherical silica powder does not easily wear the metal mold because the fact that the particle diameter thereof is small and the fact that the shape thereof is spherical and the surface thereof is smooth are combined. Accordingly, it is also possible to restrain the wear of the metal mold in a case where injection molding is repeated.

It is more preferable that the average particle diameter of the spherical silica powder is small in the above-mentioned range. However, if the average particle diameter of the spherical silica powder is too small, the dispersion properties thereof are rather reduced. Accordingly, the spherical silica powder easily aggregates so that it may not be uniformly dispersible in the surface portion of the resin pulley. This causes the possibility that the wear resistance of the resin pulley cannot be improved.

Accordingly, it is preferable that the average particle diameter of the spherical silica powder is not less than 5 μm.

In a case where another inorganic powder having a Mohs hardness of not less than 6.5, other than the silica powder, is used, a spherical inorganic powder having an average particle diameter of not more than 30 μm is preferably used, and a spherical inorganic powder having an average particle diameter of not less than 5 p m is more preferably used from the same reasons as described above.

The content of the inorganic powder having a Mohs hardness of not less than 6.5 in the total amount of the resin composition must be 15 to 50% by weight.

When the content of the inorganic powder is less than 15% by weight, the effect of improving the wear resistance of the resin pulley by adding the inorganic powder cannot be obtained.

When the content of the inorganic powder exceeds 50% by weight, the content of the phenol resin is made relatively too low depending on the content of the other component. Accordingly, it is substantially difficult to form the resin pulley by injection molding or the like.

It is preferable that the content of the inorganic powder is particularly not less than 30% by weight in the above-mentioned range so that the wear resistance of the resin pulley may be improved. Further, it is preferable that the content of the inorganic powder is particularly not more than 45% by weight in the above-mentioned range so that the content of the phenol resin may be increased to form a good resin pulley having no molding defects, as described above, by injection molding or the like.

As the reinforcing fiber, various types of inorganic or organic reinforcing fibers can be used. Particularly, the inorganic fibers are preferable. Examples of the inorganic fibers include a glass fiber, a boron fiber, a carbon fiber, a silicon carbide fiber, an alumina fiber, and an inorganic whisker. Out of the inorganic fibers, particularly the glass fiber is preferable because it is easy to produce and obtain, is low in cost, and is superior in a reinforcing effect.

The content of the reinforcing fiber in the total amount of the resin composition must be 20 to 40% by weight.

When the content of the reinforcing fiber is less than 20% by weight, the effect of improving dimensional stability and strength by adding the reinforcing fiber cannot be obtained.

When the content of the reinforcing fiber exceeds 40% by weight, so-called belt attacking properties for damaging a belt to be combined with the resin pulley is strengthened.

It is preferable that the content of the reinforcing fiber is particularly not more than 30% by weight in the above-mentioned range so that belt attacking properties may be restrained.

A resin powder having lubricating properties is preferably used as a lubricant. As such a resin powder, a fluororesin powder superior in lubricating properties, such as polytetrafluoroethylene (PTFE) powder is preferable.

Preferable as the fluororesin powder is one having an average particle diameter of not more than 10 μm, as described above.

The fine fluororesin powder having an average particle diameter of not more than 10 μm can be more uniformly dispersed in the surface portion of the resin pulley. Only by adding the fluororesin powder in small amounts, therefore, good lubricating properties can be provided to the surface of the resin pulley.

It is more preferable that the average particle diameter of the fluororesin powder is small in the above-mentioned range. However, if the average particle diameter of the fluororesin powder is too small, the dispersion properties thereof are rather reduced. Accordingly, the fluororesin powder easily aggregates so that it may not be uniformly dispersible in the surface portion of the resin pulley. This causes the possibility that good lubricating properties cannot be provided to the surface of the resin pulley.

Therefore, it is preferable that the average particle diameter of the fluororesin powder is not less than 1 μm.

The content of the lubricant such as the fluororesin powder in the total amount of the resin composition must be 1 to 5% by weight.

When the content of the lubricant is less than 1% by weight, the effect of providing good lubricating properties to the surface of the resin pulley by adding the lubricant cannot be obtained.

When the content of the lubricant exceeds 5% by weight, the heat resistance of the resin pulley is reduced because the greater part of the lubricant, for example, the above-mentioned fluororesin powder is a component lower in heat resistance than a cured product of the phenol resin. Accordingly, the heat resistance of the resin pulley is reduced.

It is preferable that the content of the lubricant is particularly not less than 2% by weight in the above-mentioned range so that better lubricating properties may be provided to the surface of the resin pulley. Further, it is preferable that the content of the lubricant is particularly not more than 4% by weight in the above-mentioned range so that the heat resistance of the resin pulley may be improved.

It is also possible to add to the resin composition various types of additives, e.g., a colorant such as a pigment, a release agent for making it easy to release the resin pulley after molding from a metal mold, and a curing agent such as hexamethylenetetramine, described above, in a range of a known content in addition to the above-mentioned components.

In the resin pulley according to the present invention, the wear resistance thereof represented by the wear thickness (mm) on a friction surface of a groove which has been measured after continuously rotating the resin pulley for 1000 hours under conditions of the number of revolutions of 8000 rpm under a dust atmosphere of a dust amount of 1 $kg/m^3$ and a dust flow rate of 1 m/s in order to improve durability and strength is preferably less than 0.4 mm, more preferably not more than 0.38 mm, and still more preferably not more than 0.35 mm.

EXAMPLE

Description is now made of the present invention on the basis of examples and comparative examples.

Example 1

The following components were mixed by a Henschel mixer, and a mixture obtained was kneaded by a heat roll heated at 85° C. into a sheet shape, and was then ground, to produce a resin composition.

TABLE 1

| Component | Wt % |
| --- | --- |
| Resol type phenol resin (※1) | 23 |
| Spherical silica powder (※2) | 40 |
| Glass fiber (※3) | 30 |
| Fluororesin powder (※4) | 2 |
| Pigment, release agent, etc. | 5 |

※1: number average molecular weight 800
※2: average particle diameter 20 μm, Mohs hardness 7~8
※3: average fiber diameter 13 μm, average fiber length 250 μm
※4: average particle diameter 10 μm, RUBRON ® L-2 manufactured by Daikin Industries, Ltd.

The number average molecular weight of the resol type phenol resin was measured by charging a high-speed liquid chromatograph [HLC-802A manufactured by Tosoh Corporation] with TSK-Gel Column G3000H8 (×1), G2000H8 (×2), and G1000H8 (×1) as columns.

Furthermore, a metal mold of a film gate type having a cavity corresponding to the shape of the pulley main body 11 of the resin pulley 1 shown in FIG. 1 and having a holding portion for holding the outer ring 21 of the rolling bearing 2 provided at a position, corresponding to the center of the pulley main body 11, of the cavity was prepared.

The metal mold was then set in an injection molding machine and was heated at 170° C., and the resin composition was supplied to a hopper of the injection molding machine.

After the outer ring 21 was set in the holding portion of the metal mold and was clamped, the resin composition melted and kneaded in the cylinder was injected into the cavity to fill the cavity therewith, was cured to mold the pulley main body 11, and was integrated with the outer ring 21.

Thereafter, an insert molded product obtained by integrating the pulley main body 11 and the outer ring 21 was taken out of the metal mold and was cooled, was then combined with the rolling element 22, the inner ring 23, the cage 24, and the covers 25 and 26 to assemble the rolling bearing 2, and the assembled rolling bear in was filled with grease, thereby producing the resin pulley 1.

Examples 2 and 3, Comparative Examples 1 to 4

The resin pulley 1 shown in FIG. 1 was produced in the same manner as in the example 1 except that a resin composition produced by blending components shown in Table 2 was used.

The components, other than the components described in the example 1, in Table 2 are as follows:

(Inorganic Powder)
Non-spherical silica powder: average particle diameter 100 μm, Mohs hardness 7~8
Mica powder: average particle diameter 50 μm, Mohs hardness 3
(Reinforcing Fiber)
Potassium titanate whisker: inorganic fiber, average fiber diameter 0.5 μm, average fiber length 15 μm
Cotton fiber: organic fiber, average fiber diameter 15 μm, average fiber length 100 μm The following tests were performed on the resin pulley 1 produced in each of the above-mentioned examples and comparative examples, to evaluate the properties thereof.

Wear Resistance Test

A belt made of rubber was stretched between the resin pulley 1 in each of the examples and the comparative examples and a metal pulley. A belt has an indented surface corresponding to an indented shape of a groove 11a on the outer periphery of the pulley main body 11 provided on its inner periphery, which is not illustrated.

After the resin pulley 1 was continuously rotated for 1000 hours under conditions of the number of revolutions of 8000 rpm in a dust atmosphere of a dust amount of 1 kg/m$^3$ and a dust flow rate of 1 m/s, the wear thickness (mm) on an inclined surface of the groove 11a was measured, to evaluate the wear resistance thereof.

Belt Attacking Property Test

The degree of damage to the indented surface, in contact with the groove 11a, of the above-mentioned belt which has been continuously rotated was observed and was evaluated in the following standards:

GOOD: hardly damaged. There are no belt attacking properties

BAD: violently damaged and not reusable. There are belt attacking properties.

Heat Shock Resistance Test

In order to evaluate the dimensional stability of the resin pulley 1 in each of the examples and the comparative examples, processing for heating the resin pulley 1 at 120° C. for thirty minutes and then cooling the resin pulley 1 at −40° C. for thirty minutes was taken as one cycle, and the cycle was repeated 1000 times. Thereafter, it was observed whether or not the pulley main body 11 was clacked. The resin pulley which was not clacked was evaluated as GOOD (good heat shock resistance), and the resin pulley which was clacked was evaluated as BAD (bad heat shock resistance).

The foregoing results were shown in Table 2.

TABLE 2

|  | Ex. 1 | Ex. 2 | Ex. 3 | C. ex. 1 | C. ex. 2 | C. ex. 3 | C. ex. 4 |
| --- | --- | --- | --- | --- | --- | --- | --- |
| Resol type phenol resin (wt %) | 23 | 35 | 43 | 28 | 30 | 30 | 45 |
| Spherical silica powder (wt %) | 40 | 33 | 20 | — | — | — | — |
| Non-spherical silica powder (wt %) | — | — | — | 20 | — | — | 5 |
| Mica powder (wt %) | — | — | — | — | 40 | — | — |
| Glass fiber (wt %) | 30 | 25 | 30 | 45 | 25 | 25 | 40 |
| Pottasium titanate whisker (wt %) | — | — | — | — | — | 38 | — |
| Cotton fiber (wt %) | — | — | — | — | — | — | 5 |
| Fluororesin powder (wt %) | 2 | 2 | 2 | 2 | — | 2 | — |
| Pigment, release agent, etc. (wt %) | 5 | 5 | 5 | 5 | 5 | 5 | 5 |

TABLE 2-continued

|  | Ex. 1 | Ex. 2 | Ex. 3 | C. ex. 1 | C. ex. 2 | C. ex. 3 | C. ex. 4 |
|---|---|---|---|---|---|---|---|
| Wear resistance (wear thickness mm) | 0.20 | 0.24 | 0.33 | 0.52 | 0.58 | 0.48 | 0.40 |
| Belt attacking properties | GOOD | GOOD | GOOD | BAD | BAD | BAD | BAD |
| Heat shock resistance | GOOD | GOOD | GOOD | GOOD | BAD | GOOD | GOOD |

From Table 2, it was found that the resin pulley in the comparative example 1 was superior in heat shock resistance and had good dimensional stability because the content of the glass fiber was as high as 45% by weight, but was inferior in wear resistance because it had a wear thickness as large as 0.52 mm. Further, it was also found that the resin pulley in the comparative example 1 had belt attacking properties.

It was found that the resin pulley in the comparative example 2 had a wear thickness as large as 0.58 mm and was inferior in wear resistance because it used a soft mica powder as an inorganic powder. Further, it was also found that the resin pulley in the comparative example 2 had belt attacking properties because fluororesin powder serving as a lubricant was omitted so that the effect of providing good lubricating properties could not be obtained.

Furthermore, it was also found that the resin pulley in the comparative example 2 was easily clacked upon receipt of heat shock and was inferior in heat shock resistance because the fluidity of a resin composition at the time of molding was reduced by overfilling the resin pulley with a mica powder so that weld strength in its weakest portion was reduced.

It was found that the resin pulley in the comparative example 3 was superior in heat shock resistance and had good dimensional stability because it used no inorganic powder and simultaneously used a glass fiber and a potassium titanate whisker as a reinforcing fiber, and the content of the sum of the glass fiber and the potassium titanate wisker was as high as 63% by weight, but was inferior in wear resistance because it had a wear thickness as large as 0.48 mm. Further, it was also found that the resin pulley in the comparative example 3 had belt attacking properties.

Furthermore, it was found that the resin pulley in the comparative example 4 obtained by omitting the elastomer from the construction of the above-mentioned Patent No. 3192082 was inferior in wear resistance because it had a content as low as 5% by weight of the non-spherical silica powder and used a soft cotton fiber as a reinforcing fiber so that it had a wear thickness as large as 0.40 mm.

Contrary to this, it was confirmed that each of the resin pulleys in the examples 1 to 3 was superior in wear resistance because it had a small wear thickness, was superior in heat shock resistance, and had no belt attacking properties.

Comparing the examples, it was also confirmed that as the content of the spherical silica powder was increased, the wear thickness was reduced so that the wear resistance could be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An improved resin pulley formed at least in part of a resin composition, wherein the improvement comprises:
   the resin composition contains a phenol resin as a base resin, and contains 33 to 40% by weight of a spherical silica power, 25 to 30% by weight of a glass fiber, and 1 to 5% by weight of fluororesin powder having an average particle diameter of not more than 10 μm as lubricant.

2. The resin pulley according to claim 1, wherein the spherical silica powder has an average particle diameter of not more than 30 μm.

3. The resin pulley according to claim 1, wherein the phenol resin is a phenol resin having a number average molecular weight of 600 to 900.

4. The resin pulley according to claim 1, wherein the average diameter of the fluororesin powder is not less than 1 μm.

* * * * *